United States Patent
Shafton et al.

(10) Patent No.: US 9,542,394 B2
(45) Date of Patent: Jan. 10, 2017

(54) METHOD AND SYSTEM FOR MEDIA-BASED EVENT GENERATION

(75) Inventors: Peter Shafton, San Francisco, CA (US); David A. Shamma, San Francisco, CA (US); Ryan Shaw, Berkeley, CA (US); Patrick Schmitz, San Francisco, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 1402 days.

(21) Appl. No.: 11/763,383

(22) Filed: Jun. 14, 2007

(65) Prior Publication Data

US 2008/0313227 A1 Dec. 18, 2008

(51) Int. Cl.
*G06F 7/00* (2006.01)
*G06F 17/30* (2006.01)
(Continued)

(52) U.S. Cl.
CPC ....... *G06F 17/30038* (2013.01); *G11B 27/105* (2013.01); *G11B 27/11* (2013.01)

(58) Field of Classification Search
CPC ............ G06F 17/30017; G06F 17/3074; G06F 17/30781; G06F 17/30301; G06F 17/30011; G06F 17/30943; G06F 17/30056; G06F 17/30058; G06F 17/00; G06F 17/60; G06F 15/00; G06Q 30/00; G06Q 30/02; G06Q 30/06; G06Q 50/00; G06Q 30/0241; G06Q 10/06; H04N 7/173; G01N 21/59; G01N 25/00
(Continued)

(56) References Cited

U.S. PATENT DOCUMENTS 5,717,869 A * 2/1998 Moran .................. G06Q 10/10
707/999.002
6,154,771 A * 11/2000 Rangan et al. ............... 709/217
(Continued)

FOREIGN PATENT DOCUMENTS

EP 1421792 * 5/2004
KR 10-2000-0036934 7/2000
(Continued)

OTHER PUBLICATIONS

Terveen et al., Beyond Recommender Systems: Helping People Help Each Other ; AT & T Lab, 2001.*
(Continued)

*Primary Examiner* — Daniel Kuddus
(74) *Attorney, Agent, or Firm* — James J. DeCarlo; Greenberg Traurig LLP

(57) ABSTRACT

Systems and methods are described allowing dynamic selection of media items for presentation within a media stream based on dynamically-generated information that describes the content of the media stream or the stream's consumer. Systems may include meta data servers and media servers that work together to dynamically select media items and dynamically build a media stream containing the selected media items to the consumer. The media items are selected based on dynamically-generated meta data. Such meta data may be generated by previous consumers of the media stream and provide an accurate and dynamic description of the contents of the media stream. Because the media items are dynamically selected based on dynamically-generated meta data, even though the same media stream may be requested by different media consumers, each media stream is individually generated and may be a unique stream that reflects the impressions of previous consumers of the stream.

9 Claims, 3 Drawing Sheets

(51) Int. Cl.
*G11B 27/10* (2006.01)
*G11B 27/11* (2006.01)

(58) Field of Classification Search
USPC .................................. 707/608, 702, 999.001
See application file for complete search history.

(56) References Cited

U.S. PATENT DOCUMENTS

| | | | | |
|---|---|---|---|---|
| 6,236,395 | B1* | 5/2001 | Sezan | G06F 17/30035 |
| | | | | 348/E5.105 |
| 6,332,147 | B1* | 12/2001 | Moran | G06F 17/30017 |
| | | | | 707/E17.009 |
| 6,448,980 | B1* | 9/2002 | Kumar et al. | 715/745 |
| 6,452,609 | B1* | 9/2002 | Katinsky | G06F 17/30053 |
| | | | | 707/E17.001 |
| 6,573,907 | B1* | 6/2003 | Madrane | G06F 17/30787 |
| | | | | 707/E17.028 |
| 6,611,862 | B2* | 8/2003 | Reisman | G06F 8/65 |
| | | | | 705/1.1 |
| 6,826,534 | B1* | 11/2004 | Gupta et al. | 705/7.12 |
| 7,111,009 | B1* | 9/2006 | Gupta | G06F 17/241 |
| | | | | 369/30.08 |
| 7,194,687 | B2* | 3/2007 | Sezan | H04L 12/2805 |
| | | | | 715/716 |
| 7,275,063 | B2* | 9/2007 | Horn | G06F 17/3002 |
| 7,685,198 | B2* | 3/2010 | Xu et al. | 707/748 |
| 7,908,556 | B2* | 3/2011 | Shamma | G06F 17/30525 |
| | | | | 715/716 |
| 8,060,509 | B2* | 11/2011 | deVries et al. | 707/736 |
| 8,214,387 | B2* | 7/2012 | King | H04N 1/00244 |
| | | | | 235/375 |
| 2001/0032335 | A1* | 10/2001 | Jones | H04L 29/06 |
| | | | | 725/105 |
| 2002/0012925 | A1* | 1/2002 | Chee | H04L 12/2805 |
| | | | | 715/716 |
| 2002/0056102 | A1* | 5/2002 | Dillon et al. | 725/39 |
| 2002/0120925 | A1* | 8/2002 | Logan | A23L 1/3002 |
| | | | | 725/9 |
| 2002/0120935 | A1* | 8/2002 | Huber et al. | 725/60 |
| 2002/0184373 | A1* | 12/2002 | Maes | 709/228 |
| 2003/0093790 | A1* | 5/2003 | Logan | G06F 17/30265 |
| | | | | 725/38 |
| 2003/0196094 | A1* | 10/2003 | Hillis | G06F 21/64 |
| | | | | 713/179 |
| 2004/0021685 | A1* | 2/2004 | Denoue | G06F 17/30017 |
| | | | | 715/721 |
| 2004/0220925 | A1* | 11/2004 | Liu et al. | 707/3 |
| 2005/0216454 | A1* | 9/2005 | Diab et al. | 707/3 |
| 2005/0216457 | A1* | 9/2005 | Walther et al. | 707/4 |
| 2005/0234958 | A1* | 10/2005 | Sipusic | G06F 3/0485 |
| 2005/0256866 | A1* | 11/2005 | Lu et al. | 707/5 |
| 2006/0218563 | A1 | 9/2006 | Grinstein et al. | 719/328 |
| 2006/0230065 | A1* | 10/2006 | Plastina | G06F 17/30053 |
| 2006/0253418 | A1* | 11/2006 | Charnock | G06F 17/30716 |
| 2006/0257912 | A1* | 11/2006 | Kaemmerer | C12N 15/113 |
| | | | | 435/6.16 |
| 2006/0280437 | A1* | 12/2006 | Logan | H04N 5/765 |
| | | | | 386/230 |
| 2006/0287912 | A1* | 12/2006 | Raghuvamshi | G06Q 30/0241 |
| | | | | 705/14.4 |
| 2006/0294134 | A1* | 12/2006 | Berkhim et al. | 707/102 |
| 2006/0294192 | A1* | 12/2006 | Mao et al. | 709/213 |
| 2007/0011206 | A1* | 1/2007 | Gupta | G06F 17/241 |
| 2007/0016553 | A1* | 1/2007 | Dumais et al. | 707/2 |
| 2007/0156636 | A1* | 7/2007 | Norton et al. | 707/1 |
| 2007/0250901 | A1* | 10/2007 | McIntire | H04N 7/17318 |
| | | | | 725/146 |
| 2007/0255785 | A1* | 11/2007 | Hayashi et al. | 709/204 |
| 2008/0126388 | A1* | 5/2008 | Naaman | 707/102 |
| 2008/0172293 | A1* | 7/2008 | Raskin et al. | 705/14 |
| 2008/0235256 | A1* | 9/2008 | Sridhar | 707/102 |
| 2008/0281622 | A1* | 11/2008 | Hoal | 705/1 |
| 2008/0281710 | A1* | 11/2008 | Hoal | G06Q 30/02 |
| | | | | 705/14.39 |
| 2009/0119572 | A1* | 5/2009 | Koivunen | 715/206 |

FOREIGN PATENT DOCUMENTS

| | | |
|---|---|---|
| KR | 10-2000-0050255 | 8/2000 |
| KR | 10-2000-0054315 | 9/2000 |

OTHER PUBLICATIONS

Chiu et a., "LiteMibutes: An Internet-Based System for Multimedia Meeting Minutes". ACM 2001.*
EP 1421792 B1.*
International Search Report (PCT/US08/064325) dated Oct. 6, 2008.

* cited by examiner

METHOD AND SYSTEM FOR MEDIA-BASED EVENT GENERATION

BACKGROUND

The Internet is increasingly being used to transmit, store, view and share media files. These media files are sometimes short (two minutes or less) and sometimes longer, sometimes as long as several hours. As media consumers have adopted the use of the Internet for media delivery, the streaming media on demand, i.e., that is transmitting a stream of media content to the consumer for immediate playback on the consumer's device, has greatly increased.

One benefit of streaming media is that the contents of the media stream, e.g., the distinct media items that combined to make the stream of media, can be selected dynamically and in real-time. For example, a consumer may request a current events news program be streamed to the consumer for viewing and the resulting stream may be generated by assembling various independent media items such as news stories which are then sequentially transmitted to the consumer in as a single continuous stream of media data.

Current streaming media systems have been developed using the television stream as a template, and therefore mimic television's model of inserting seemingly random advertisements into the stream at specified points in the stream, known as commercial breaks. The advertisements bear no contextual relationship with the underlying media content and therefore rarely engage the consumer's attention.

SUMMARY

Systems and methods are described allowing dynamic selection of media items (e.g., advertisements) for presentation within a media stream based on dynamically-generated information that describes the content of the media stream or is otherwise relevant to the consumer. Systems may include meta data servers which provide relevant meta data that in some way describes the content of a media stream to aid in the selection of media items. Systems may also include media servers which receive the meta data and select media items based on the meta data received. Because the media items are dynamically selected based on dynamically-generated meta data, even though the same media stream may be requested by different media consumers, each media stream is individually generated and may be a unique stream. Not only is each consumer provided with a unique experience, each consumer may be presented with media items selected specifically for that consumer or based on information known about the stream and/or the consumer.

Methods may include methods of providing relevant meta data based on the presentation of media streams including information about the user to whom the media stream is being presented, information about users in a community with that user, and/or information about the media stream.

In one aspect, the disclosure describes a system which includes a meta data server that selects meta data related to a viewer of a media stream based on where the media stream is in its playback. The system further includes a media server that selects a media item to present with the media stream based on the meta data, and that transmits the media item for presentation to the viewer. The system also may include a media player that generates the time data and transmits the time data to the meta data server.

The media server may transmit the media item as part of the media stream to the first user. The media stream may include multiple media items including the dynamically selected media items and media items pre-selected based on the media stream.

In another aspect, the disclosure describes a method, which could be used by a media server, for dynamically selecting a media item based on the presentation of a media stream to a viewer. The method includes receiving an annotation associated with a media item, in which the annotation was selected based on the presentation of the media stream to the viewer. The annotation was selected in response to the presentation of the media stream reaching a user-assigned time associated with the annotation. The method then selects a media item based on the received annotation and transmits the selected media item for presentation to the viewer with the media stream. The selected media item may be an advertisement. The annotation may be an annotation created by the viewer or by an earlier viewer.

In another aspect, the disclosure describes a method for selecting an annotation from a set of annotations, which can then be used to select a media item. The method includes receiving a plurality of user-created annotations associated with media items in a media stream. The annotations are dynamically generated from viewers of the associated media items. In the method, a time trigger is then received which was generated as a result of a presentation of the media stream. While the media stream is still be presented, the method selects a user-created annotation from the plurality of user-created annotations based on the received time trigger and transmits the selected user-created annotation to a media server for use in a selection of a media item for presentation along with the media stream.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

The following description of various embodiments is merely exemplary in nature and is in no way intended to limit the disclosure.

DETAILED DESCRIPTION

Figure 1:
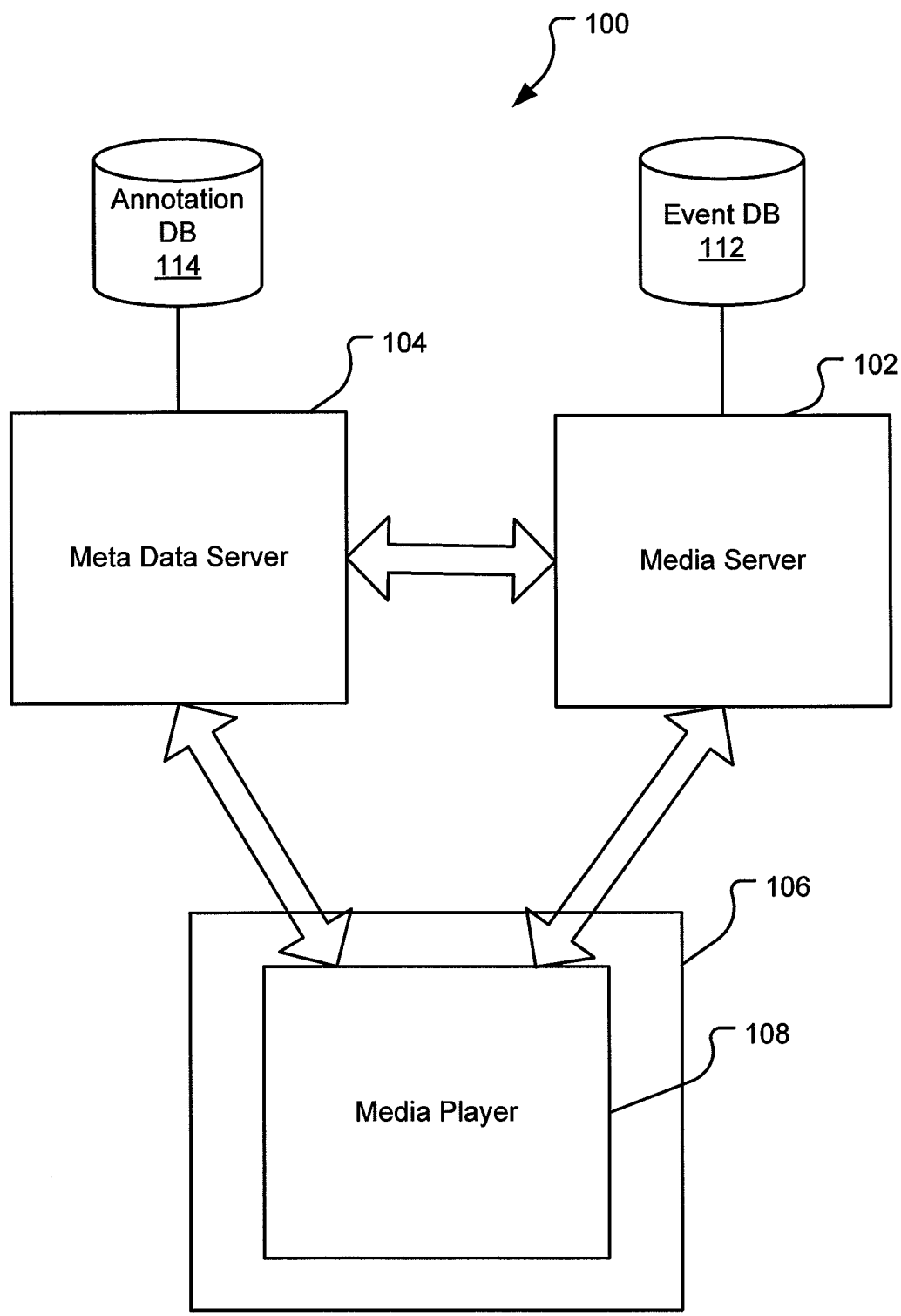
FIG. 1 shows an embodiment of a system for providing dynamic media based event generation.

The following description of various embodiments is merely exemplary in nature and is in no way intended to limit the disclosure. While various embodiments have been described for purposes of this specification, various changes and modifications may be made which will readily suggest themselves to those skilled in the art and which are encompassed in the disclosure.

As described above, the Internet is increasingly being used to transmit, store, view and share media. Entire online communities are developing which allow uploading, viewing, sharing, rating and linking to media items. These communities may use annotations to describe or categorize media items, and even specific segments within media items.

As used herein, the term "annotation" should be understood to include any information describing or identifying a media item that was dynamically created to describe the media item. Thus, broadly speaking an annotation is a type of meta data that describes or otherwise relates to a media item. An annotation is distinct from any description information that may be contained in the media item, such as descriptions created by the creator of the media item. Annotations are dynamically created by a viewer of the media item to describe the media item or some dynamically selected segment within the media item. Examples of annotations include tags, as understood by those in the art. Other examples which may be used as annotations include hyperlinks, images, video clips, avatars or other icons, emotion icons, (e.g. "emoticons") or other representations or designations.

Annotations may further include information identifying a specific segment of a media item or a discrete temporal point within the playback of the media item. Such segments may be defined in many different ways such as by identifying a start time and an end time or a duration. Other methods of defining and/or identifying segments within a media item are known in the art and any suitable method may be used with the systems and methods described herein. Annotations may also include spatial information identifying specific areas of a video frame as displayed to a consumer, e.g., information identifying the top half of the video frame or some other area.

Annotations could be created as a result of a user explicitly tagging a media item or as a result of a user sharing a portion of the media item with another user. In an embodiment, such tags associate a word or group of words with a portion of the media item marked by in time, out time and optionally x and y coordinates. Such tags may be stored in a meta data server or annotation datastore and may be changed at any point in time without altering the underlying media.

The term "media item" as used herein may include any discrete media object (e.g., a media file), now known or later developed, including video files, games, audio, streaming media, slideshows, moving pictures, animations, or live camera captures. A media item may be presented, displayed, played back, or otherwise rendered for a user to experience the media item.

The terms "media stream" and "stream" refers to a stream of media data that includes at least two media items transmitted in a sequence from one device to another device as a single, continuous communication. The stream may be stored on the receiving device for later rendering (e.g., playback or viewing) or may be rendered by the receiving device as it is received.

As described above, the systems and methods described in this disclosure relate to the dynamic selection of at least some media items in a media stream at the time the stream is being generated. For example, if a consumer requests a stream of current events news programming, the results stream may include various news-related media items which may not necessarily be dynamically selected and one or more dynamically-selected media items such as advertisements. In order to distinguish between media items that are dynamically selected and those that may be determined by the consumer's request, dynamically-selected media items will be referred to as "media events" and "events" where necessary to avoid confusion.

FIG. 1 shows an embodiment of a system 100 for providing dynamic media-based event generation. The embodiment shown can provide a user with media events (e.g., advertisements) based on a user-created annotation associated with a media stream being presented to a user. For example, a user who is watching a playback of a stream of video media items (or generally any media stream) may affect through annotations and other meta data the selection of advertisements presented along with the playback.

FIG. 1 illustrates an embodiment of a system that includes three computing devices: a meta data server 104, a media server 102 and a rendering device 106. In the embodiment shown, each device is a computing device. For the purposes of this disclosure, a computing device is a device that includes a processor and memory for storing and executing software instructions, typically provided in the form of discrete software applications. Computing devices may be provided with operating systems that allow the execution of software applications in order to manipulate data.

In an alternative embodiment, the rendering device 106 is not a computing device, but rather a purpose-built electronic device that does not execute software instructions when rendering media content.

The architecture illustrated in FIG. 1 is sometimes referred to as client/server architecture in which the rendering device 106 (referred to as a "client" 106) issues media requests to a remote computing device (referred to as a "server" because it "serves" media in response to the request), which responds by transmitting the requested media content to the client 106 for rendering. The systems and methods described herein are suitable for use with other architectures as will be discussed in greater detail below.

In the embodiment shown, the client 106 is a computing device, such as a personal computer (PC), web-enabled personal data assistant (PDA) a smart phone, a media player device such as an IPOD, or a smart TV set top box. The client 106 is connected to the servers 102, 104 by a network such as the Internet via a wired data connection or wireless connection such as a wi-fi network, a WiMAX (802.16) network, a satellite network or cellular telephone network.

The client 106 includes an application 108 for receiving and rendering media content. Such applications are commonly referred to as a media player 108. Examples of media players include WINDOWS MEDIA PLAYER and YAHOO! MUSIC JUKEBOX. In the embodiment shown, the media player 108, when executed, generates a graphical user interface (GUI) attached to or part of the client 106. The GUI includes a set of user-selectable controls through which the user of the client device can interact to control the rendering of the media and also to annotate the stream. By selection of these controls, the user may cause the client 102 to obtain and render media content from local storage or from the media server 102 and control the rendering of the media to the user.

In the embodiment shown in FIG. 1, the media player 108 generates time information as it renders or otherwise presents media items to a user. In an embodiment, the a small javascript function may be provided for or included with the media player 108 for this function.

The generated time information is then transmitted to the meta data server 104. The time information received may be, for example, the present playback time of a media stream, which is presented to a user in the media player 108. The meta data server 104 may use time information received to select a user-created annotation based on the time information. The annotations are stored in and retrieved from a datastore accessible to the meta data server 104, which in the embodiment shown is illustrated by the annotation database 114.

The terms "time," "time data," and "time information," as used herein, with respect to times within media, are references to a temporal position within a media item/stream playback. For example, uninterrupted presentation of a media stream at the intended playback rate results in a series of "times" being reached by the media stream. The time information, either in the form of a timestamp, a flag, or some other indicator, are transmitted from the media player 108 as the media player 108 renders the media. Time information may also include an identifier of the media stream being rendered and/or the media item within the media stream.

In an embodiment, the media player 108 may transmit time information to the meta data server 104. The term "presentation" as used herein, with respect to media items/streams, includes rendering or display of the media items/streams through any means to the consumer, e.g., the user of the client 106, that results in the generation of time information. For example, the time information may be generated as the result of the normal playback of the media or may be generated in response to a high-speed rendering/fast forwarding or even as a result of the user "dragging" or "scrubbing" a present time marker on a timeline in the GUI of the media player 108 to and/or across the particular time.

The media player 108 also may transmit information about what action(s) resulted in the generation of the time information (e.g., by playback at regular speed, fast forwarding, scrubbing backwards, etc.). In another embodiment, the media player 108 may transmit information about a particular time being approached. For example, a meta data server 104 may use information about events leading up to a particular time. Information may be transmitted from the player 108 about events surrounding a user who stopped playback before the particular time, a user who scrubbed away from the particular time, and a user who viewed normal playback until near a particular time, then scrubbed past that particular time. Any of the information transmitted by the player 108 may be used by the meta data server 104 to retrieve and/or create relevant meta data related to the presentation of the media stream. In event, this allows the meta data server 104 to collect usage history data from the consumers of the media items rendered by the media player 108. By analyzing this time information usage history data, the meta data server 108 may deduce information such as the relative popularity of different sections of a media item and different media items with a stream.

The meta data server 104 receives this time information from the media player 108 and, using that information, selects one or more annotations from the database 114 and transmits them to the media server 102. For example, as a media player 108 renders a media item of a media stream, it sends a piece of time information indicating that it just rendered some point of the media item to the consumer. The meta data server 104 then identifies one or more annotations that are associated with that point of the media item. The meta data server 104 then selects one or more of the associated annotations and transmits them to the media server 102.

The reader should note that over time the meta data server 104 will be receiving annotations as they are dynamically created by consumers. These dynamically-generated annotations may be received by the meta data server 104 or by another system (not shown) and stored, such as in the annotation database 114 shown. Thus, even when a consumer renders a previously viewed media item at some later time, the annotations identified by the meta data server 104 are likely to be different.

The meta data server 104 may also correlate time information with information about the media item currently being rendered by the client 106. The meta data server 104 may correlate time information with the media stream and/or media items in the media stream in order to select (e.g., retrieve from memory) relevant annotations which may be used by the media server 102 to select relevant media events (e.g., advertisements) for addition to the media stream currently being transmitted to the client 106. Thereby, the meta data server 104 can dynamically aid in the creation of a relevant stream of media items and dynamically-selected media events.

In the embodiment shown, a feedback loop may be established between the meta data server 104, the media server 102, and the media player 108. In one embodiment, the media player 108, by transmitting time information during presentation of a media stream, may trigger certain annotations to be sent from the meta data server 104 to the media server 102. Those annotations may trigger certain media events to be subsequently transmitted for presentation as part of a media stream by the media player 108. This may in turn through the presentation of the media events trigger more, possibly different annotations subsequently causing the selection of additional media events.

In another embodiment, a user experiencing the presentation of the media stream may participate in a feedback loop between meta data server 104, media server 102 and player 108. The user participates by performing some action related to a media item from a media stream which triggers information transmitted to the meta data server 104 which results in annotations being transmitted to the media server 102. For example, a user may enter a user-generated tag such as "ZZZZ" to indicate that a media item is uninteresting as the media item is transmitted to the media player 108 as a part of media stream and rendered by the media player 108.

In an embodiment, media events selected and transmitted for presentation with a media stream may be included with the media stream, and may thereby be considered to modify the media stream (e.g., through inserting into a "commercial break" in the media stream). However, it should be noted that the media events selected and transmitted by the processes and systems described herein need not be transmitted as part of the media stream initially selected for presentation to the user. For example, these media events may be transmitted as a separate communication or a separate media stream to the media player 108 or some other application on the client 106 for rendering to the user in a different window or in a different manner independent from the rendering of the original media stream.

In one embodiment, the meta data server 104 may correlate the time information received with information known about the user to whom the media stream is currently being presented. The meta data server 104 may use this correlation in order to determine if there is a user-created annotation related to the media stream (and/or individual media item) being presented to the user. For example, the user to whom the media stream is being presented may belong to a community of users, and some of the community of users may have already viewed the media stream and created annotations for a media item in the media stream.

In the embodiment shown, the meta data server 104 sends the selected annotation(s) to the media server 102 to aid in the selection of media events to aid in the creation of the media stream itself. In addition, the meta data server 104 may send time information, including the time information used in selecting the annotation, information about the media item associated with the annotation, and/or user information to the media server 102. The media server may use some or all of this information in selecting an additional media event for transmission to the client 106, along with the media stream being presented to the user.

In the embodiment shown, the media server 102 selects an appropriate media event using the meta data received from the meta data server 104 and subsequently transmits it to the media player 108. The media events are stored in and retrieved from a datastore accessible to the media server 102, which in the embodiment shown is illustrated by the event database 112. This database 112 may, or may not, be the same datastore that stores regular media items that appear in a media stream not as a result of dynamic selection. For example, the database 112 could be a database containing only advertisements for use as media events. Alternatively, all media items including those that may be selected as media events by the media server 102 may be stored in the database 112 together.

In one embodiment, a media player 108 may be operated on a remote computing device as a standalone player. For example, a standalone player may be a media player module which receives a media stream from a local source, such as a local hard drive or local optical drive. The standalone player 108 may then transmit time information to meta data server 104. In this embodiment, meta data server 104 may select annotations, as described further above, and transmit 106 them to media server 102, which then, in turn, selects one or more media items, as described above, and transmits them to the player 108 for presentation to the user in connection with the playback of the media item by the standalone player 108.

In one embodiment (not shown), meta data server 104 and media server 102 may be co-located on a single computing device or similar unified computing architecture. As illustrated in FIG. 1, media server 102 and meta data server 104 are illustrated as separate units and discussed as separate computing elements for the purpose of describing the respective selections made by meta data server 104 and by media server 102 and the communications between the two servers. However, it will be appreciated with those with skill in the art that the separate computing elements may occur in software, hardware, and or/firmware modules located within a single computing device, and communications there-between may occur across modules, within modules, or in any combination thereof. For example, in an alternative embodiment media player 108 transmits time information to media server 102, and media server 102 transmits a request for annotations associated with the time information to the meta data server 104. Thus, various functions described with reference to the embodiment shown in FIG. 1 may be distributed between different computing devices. As another example, meta data server 104 may transmit meta data (e.g., annotations) to media server 102 and media player 108, respectively, in response to time information received by the meta data server.

Elements of the systems described herein may be implemented in hardware, software, firmware, any combination thereof, or in another appropriate medium. The systems described herein may implement methods described herein. In addition, methods described herein when implemented in hardware, software, firmware, any combination thereof, or in another appropriate medium may form systems described herein.

The descriptions of the methods and systems herein supplement each other and should be understood by those with skill in the art as forming a cumulative disclosure. Methods and systems, though separately claimed herein, are described together within this disclosure. For example, the parts of the methods described herein may be performed by systems (or parts thereof) described herein.

In addition, the methods described herein may be performed iteratively, repeatedly, and/or in parts, and some of the methods or parts of the methods described herein may be performed simultaneously. In addition, elements of the systems described herein may be distributed geographically or functionally in any configuration.

Figure 2:
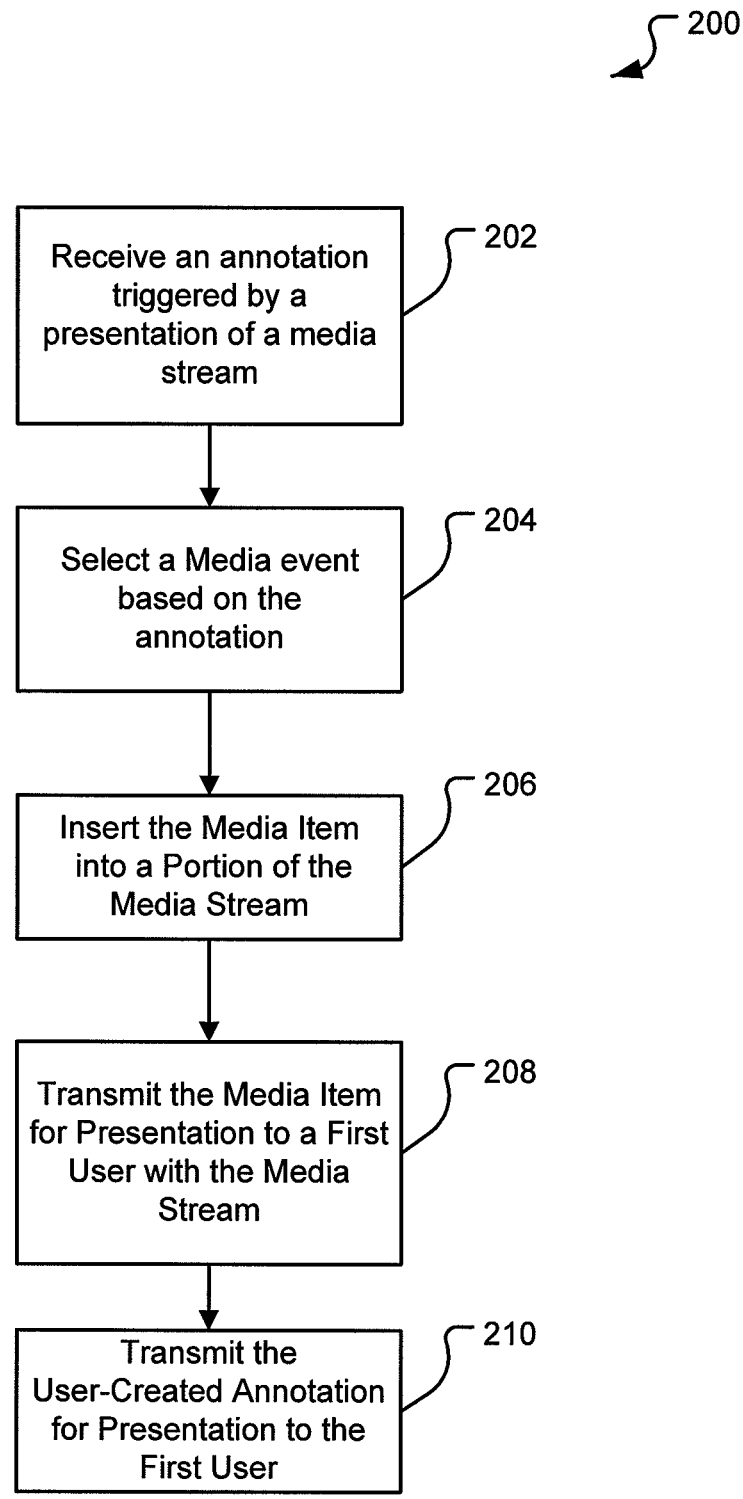
FIG. 2 shows a flow chart of an embodiment of a method for selecting and presenting a media event with a media stream.

FIG. 2 shows a flow chart of an embodiment of a method 200 for selecting and presenting a media event with a media stream based on media items in the stream. In one embodiment, the method 200 may be performed by a media server, such as described above, as the media server is transmitting the stream from the presentation of which the events are generated.

In the embodiment shown, as a media stream is being transmitted a dynamic annotation is received based on the presentation of that media stream to a user in receive annotation operation 202. For example, the annotation may be received from a separate process that analyzes time information derived from the presentation of the media stream to the user, such as that described as being performed by the meta data server 104 in FIG. 1. The dynamic annotation may have been selected based on time information or based on some other information.

The dynamic annotation is then used to select a media event in an event selection operation 204. The selection may be performed based on a predetermined correlation of the annotation with specific media events or may be a more analytical procedure involving a relevancy analysis based on a comparison of the annotation with information associated with potentially selectable media events. For example, a media event, which is related to the user-created annotation, may be related based on a topical relevancy of the file to the user-created annotation (e.g., both the event and the user-created annotation are about cycling). Alternatively, the media event may be selected based on an association of a particular annotation with a target demographic for a media event. For example, a user-created annotation such as "yachting," may be associated with a wealthy demographic which in turn identify that media events targeting that demographic, such as containing advertisements for luxury goods.

As another example, media events may be related to user-created annotations based on usage histories of users, including usage histories of individual users, usage histories of a plurality of users, and usage histories aggregating the individual usage histories of a large number of users. Usage data may include viewing histories of media streams and/or individual media items aggregated into media streams. Usage data may include histories of annotations added to media items and/or media streams. Usage data also may include histories of sharing of media items and/or media streams with other users. Usage data may also include related information to a use of a media item/stream, such as information about time of use, and information about related operations (e.g., programs used concurrently, messages sent during use of a media item).

The selecting operation 204 may be performed determinatively, semi-randomly, and/or stochastically. For example, a media event may be selected using a semi-random or a stochastic process for the purpose of introducing different correlations between media items selected (e.g., advertisements, sponsored media items). As another example, strictly-deterministic criteria may also be employed for selecting a media event based on a user-created annotation.

In the embodiment shown, the media event selected is inserted into a portion of the media stream or otherwise included with the media steam in an insertion operation 206. The media event may be inserted in a number of ways, including through inserting the media event at some location within another media item such that a user would experience a presentation of the media stream as containing a commercial break. Other types of insertion are also possible, such as inserting the media event between two adjacent media items in the media stream.

The media event is then transmitted at the appropriate time relative to the media stream for presentation by the media player in an event transmission operation 208. In an alternative embodiment, the media event may be transmitted separately from the media stream. For example, advertisements or other media events may be presented alongside the media stream in a separate frame designated for media events. In another embodiment (not shown), advertisements or other media events may be transmitted for presentation alongside the media stream in a pop-up window, which is separate from a window in which the media stream is being presented.

In the embodiment shown, an optional operation 210 is included in which a user-created annotation, which may be the annotation provided in the receive annotation operation 202, is transmitted for presentation to the first user. This annotation transmission operation 210 allows the media player to render or otherwise present the annotations associated with transmitted media items and segments to the user. The annotation may be transmitted as part of the media stream, e.g., with its associated media item, or separately from the stream, depending on how the media player is designed.

It should be noted that, depending on the embodiment, the media stream may be transmitted from a source different from the source that transmits the annotation. For example, in an embodiment, the media stream and the annotation may be transmitted for presentation to a user from the media server. In an alternative embodiment, the user-created annotation may be transmitted from the meta data server.

Transmitting may be performed in any manner known to those with skill in the art, or a manner later developed, including, for example, transmission over a publicly-accessible network or via radio waves.

A feedback loop may be established, at least partially, using the embodiment of the method 200 shown in FIG. 2. For example, upon transmitting 208 a media event (e.g., an advertisement) for presentation to a user with a media stream, the user may select the media item and begin a further presentation or a secondary presentation of a different media stream (e.g., by terminating the presentation of the original media stream and initiating the presentation of the new media stream or by opening a separate window via the selection), and thereby the user may trigger further user-created annotations to be received in the receive annotation operation 202.

As another example, a user may annotate or other perform an action that results in an annotation being associated with the currently rendered media items. This annotation may be immediately transmitted to the media server and received in the receive annotation operation 202 so that the media stream may be modified in response to the user's feedback as documented by the annotation. Because a user may dynamically affect media items presented with a media stream, a feedback loop may be created between the presentation to a user of a media stream, the user's actions with respect to the media stream (and/or media items presented with the media stream), and the selection of those media items for future presentation to the user.

Figure 3:
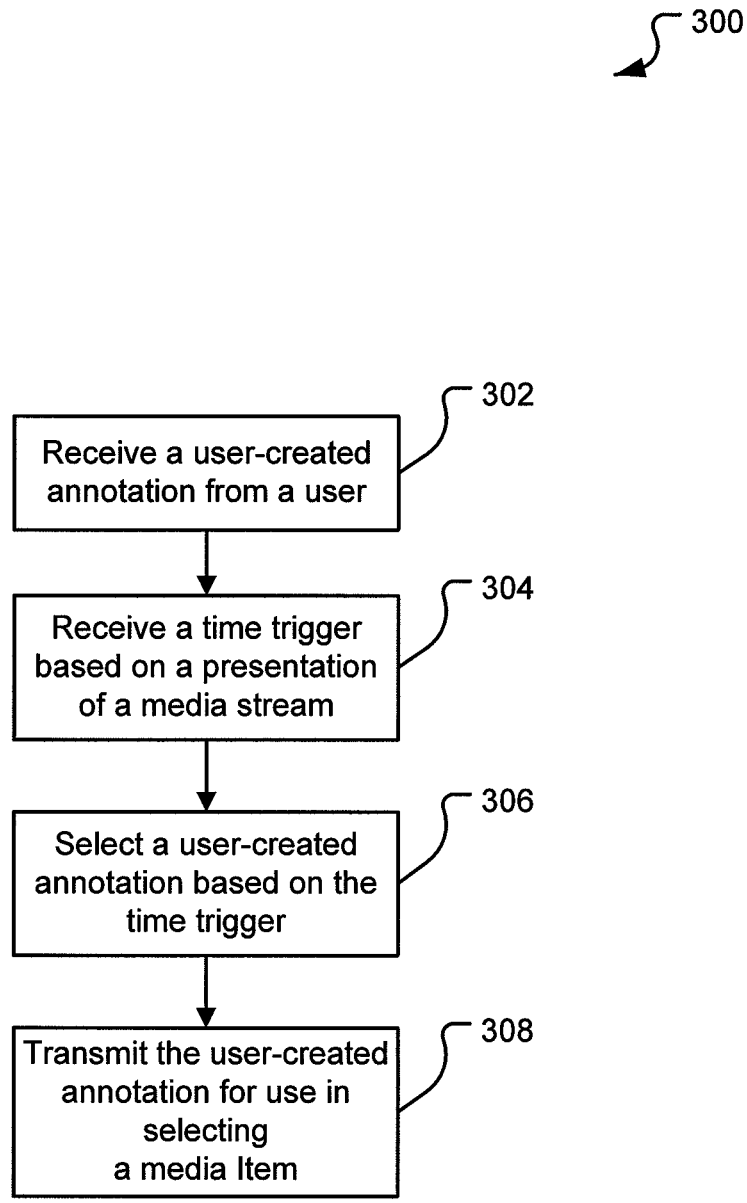
FIG. 3 shows a flow chart of an embodiment of a method for selecting annotations based on a time trigger.

FIG. 3 shows a flow chart of an embodiment of a method 300 for selecting annotations based on a time trigger. In one embodiment, a meta data server, as described above, may implement a method similar to method 300 shown. In an alternative embodiment, a combined server (e.g., a computing device performing meta data server and media server functions as described in FIG. 1) may implement a method similar to method 300 in combination with a media event selection method, such as that described with reference to FIG. 2.

In the method 300 shown, a meta data server has access to a database or other data store of annotations. Each annotation is associated with at least one media item. In the embodiment shown in FIG. 3, the collecting of these annotations is illustrated by receive annotations operation 302. As described above, the annotations may be received as the result of explicit submittal of annotations to the system or may be generated based on previous actions performed by users related to a media item.

The meta data server subsequently receives a time trigger generated by a client as a result of the presentation of a media item, individually or as part of media stream, to a user in a receive time trigger operation 304. The time trigger may be triggered from a presentation of a media stream having reached a user-assigned time or may be time information that simply reports the current status of the presentation. As described further above, a user-assigned time may not have to be exactly reached by a presentation in order for a time trigger to be created (e.g., triggered). Also as described further above, a presentation may be moved from one time to another via playback of a media stream as well as through user-controlled scrubbing or dragging through the media stream.

In an embodiment, the time trigger is received from the media player that is presenting the media stream to the user. In an alternative embodiment, a time trigger may be received from a media server that is transmitting (e.g., streaming) the media stream to the client. In yet another embodiment, a time trigger may be created by an entity with knowledge of the presentation of the media stream such as another application running on the client that is monitoring the presentation of the media stream and transmitting time triggers.

A user-created annotation is then selected in a selection operation 306 based on the received time trigger. The selection may be based on information known about the user that is viewing a media item in the media stream. For example, the media stream may include a media item associated with an annotation that was originally created by the viewer or was created by a different user that is associated with the viewer. For example, the current viewer and a previous user that supplied an annotation may be in a community of users. Based on this association, the annotation generated by the previous user may be considered more relevant and therefore selected from other annotations for the same media item. Furthermore, usage history for users in the viewer's community that may have already generated (explicitly or otherwise) annotations associated with the time trigger received may be aggregated and used to identify one or more annotations that are popular within the community.

The community may be defined as the community of all viewers or may be limited to a very small community to which the current viewer is a member. The user may have actively joined the community or may be considered by the system to be within the community based on information known about the viewer. Thus, a viewer with a known history of purchasing disco music may be part of a disco community for the purposes of annotation selection.

The selection may also be made based primarily on the time trigger and media item. For example, the operators of the system may have certain annotations assigned to specific media items. Such assignments may have been made for product placement purposes or based on the operator's dynamic creation of an annotation for that media item or segment. Thus, an operator that provides new-related media streams may initially annotate the media items for the stream so that for the first few viewers of the media stream the system will have at least some annotation to select.

In the embodiment shown, after a user-created annotation is selected, the annotation is then transmitted to the media server in a transmit annotation operation 308. The media server, as described above, then uses the annotation as a basis for selecting a media event (e.g., an advertisement). In an alternative embodiment, the transmit annotation operation 308 may transmit the annotation to a different server, such as an advertisement server, which selects the media event. In yet another embodiment, the transmit annotation operation 308 may transmit the annotation to the one embodiment, the user-created annotation may be transmitted to a media server, such as further described above. The method 300, via transmitting the user-created annotation, can provide for dynamic selection and presentation of media items with a media stream based on the media which is being presented to the user and based on particular usage data and/or user-created annotations related to that media.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present disclosure. Alternative embodiments of methods and systems described herein are also possible in which some or all of the operations are performed in a different order or distributed between different devices than those described above. Numerous other changes may be made which will readily suggest themselves to those skilled in the art and which are encompassed in the spirit of the disclosure and as defined in the appended claims.

What is claimed is:

1. A computer implemented method comprising:
   receiving, at a computing device, a plurality of user-created annotations associated with media items in a media stream, the user-created annotations created by viewing users of the media items, each user-created annotation associated with a media item of said media stream;
   receiving, at the computing device, a time trigger generated as a result of a presentation of the media stream;
   selecting, via the computing device, a user-created annotation from the plurality of user-created annotations based on the received time trigger and usage history information related to the media stream, said selection of the user-created annotation further comprising:
      identifying that a first user is viewing the presentation of the media stream;
      selecting a user-created annotation received from a second user different from and associated with the first user;
      determining that the first user is part of a community of users that includes the second user; and
      selecting, based on a usage history of the community of users including the first user and the second user, a user-created annotation received from one or more users in the community; and
   transmitting, over a network, the selected user-created annotation to a media server for selection of an associated media item, wherein the selected media item is transmitted along with the media stream.

2. The method of claim 1, wherein the second media item is an advertisement.

3. The method of claim 1, wherein the user-created annotation is an annotation created by the first user.

4. The method of claim 1, wherein selecting the user-created annotation further comprises:
   selecting a user-created annotation received from the first user.

5. The method of claim 1, further comprising:
   selecting a second media item for inclusion in the media stream based on the selected user-created annotation, said selection of the second media item comprising identifying the user-created annotation based on usage history information related to the media stream; and
   transmitting, over a network, the second media item to the first user with the media stream.

6. The method of claim 5, wherein selecting the second media item is further based on usage information of the first user.

7. The method of claim 5, wherein selecting the second media item is further based on usage information of the second user.

8. The method of claim 5, further comprising:
   before transmitting the second media item, inserting the second media item into the media stream;
   wherein transmitting the second media item is performed via transmitting the media stream.

9. The method of claim 5, wherein transmitting the second media item further comprises:
   transmitting the second media item and an indication that the second media item be presented in a first display window separate from a second display window presenting the media stream on a display of a user computing device.

\* \* \* \* \*